United States Patent
Oberdoerster (10) Patent No.: US 9,442,006 B2
(45) Date of Patent: Sep. 13, 2016

(54) METHOD AND APPARATUS FOR MEASURING THE SHAPE OF A WAVE-FRONT OF AN OPTICAL RADIATION FIELD

(71) Applicant: Berliner Glas KGaA Herbert Kubatz GmbH & Co., Berlin (DE)

(72) Inventor: Thomas Oberdoerster, Berlin (DE)

(73) Assignee: Berliner Glas KGaA Herbert Kubatz GmbH & Co., Berlin (DE)

( * ) Notice: Subject to any disclaimer, the term of this patent is extended or adjusted under 35 U.S.C. 154(b) by 0 days.

(21) Appl. No.: 14/751,259

(22) Filed: Jun. 26, 2015

(65) Prior Publication Data

US 2016/0018259 A1    Jan. 21, 2016

(30) Foreign Application Priority Data

Jul. 18, 2014  (DE) .................. 10 2014 010 667

(51) Int. Cl.
  *G01J 1/00* (2006.01)
  *G01J 1/42* (2006.01)
  *G01J 1/04* (2006.01)

(52) U.S. Cl.
  CPC ............ *G01J 1/4257* (2013.01); *G01J 1/0477* (2013.01)

(58) Field of Classification Search
  USPC ................................................ 356/121–137
  See application file for complete search history.

(56) References Cited

U.S. PATENT DOCUMENTS

| | | |
|---|---|---|
| 4,641,962 A | 2/1987 | Sueda et al. |
| 4,725,138 A | 2/1988 | Wirth et al. |
| 4,824,243 A | 4/1989 | Wheeler et al. |
| 5,289,254 A | 2/1994 | Braunecker et al. |
| 5,294,971 A | 3/1994 | Braunecker et al. |
| 5,912,731 A | 6/1999 | DeLong et al. |
| 6,750,957 B1 | 6/2004 | Levecq et al. |
| 7,061,959 B2 | 6/2006 | Partlo et al. |

FOREIGN PATENT DOCUMENTS

| | | |
|---|---|---|
| DE | 3318293 A1 | 12/1983 |
| DE | 4003698 A1 | 8/1991 |
| DE | 4003699 A1 | 8/1991 |

(Continued)

OTHER PUBLICATIONS

English-language abstract for DE 102010038648 (2012).

*Primary Examiner* — Tri T Ton
(74) *Attorney, Agent, or Firm* — Caesar Rivise, PC (57) ABSTRACT

Method for measuring shape of wavefront of optical radiation field generated by radiation source, includes: (a) setting diaphragm positions in pinhole diaphragm having diaphragm opening movable transversely to radiation source's optical axis, wherein a partial beam from radiation field passes through diaphragm opening at each diaphragm position and is imaged on optical sensor by imaging optics device; (b) recording lateral positions of partial beam relative to optical axis of imaging optics device, wherein lateral positions each with one of the diaphragm positions of pinhole diaphragm are recorded by optical sensor, and determining the shape of wavefront from recorded lateral positions of partial beam, wherein beam incidence range of the partial beam which is invariable for all diaphragm positions is set on imaging optics device with a pentaprism arrangement including at least first pentaprism and positioned between pinhole diaphragm and imaging optics device. A wavefront shape measuring device is also described.

11 Claims, 3 Drawing Sheets

(56) References Cited

FOREIGN PATENT DOCUMENTS

| | | |
|---|---|---|
| DE | 3878402 T2 | 6/1993 |
| DE | 60004020 T2 | 6/2004 |
| DE | 102010038648 A1 | 2/2012 |
| EP | 0203530 A2 | 12/1986 |
| EP | 0921382 A2 | 6/1999 |
| WO | 0128411 A1 | 4/2001 |

METHOD AND APPARATUS FOR MEASURING THE SHAPE OF A WAVE-FRONT OF AN OPTICAL RADIATION FIELD

BACKGROUND OF THE INVENTION

The invention relates to a method for measuring the shape of a wavefront of an optical radiation field that is generated by an active radiation source, particularly a method for determining at least one radius of curvature of the wavefront. Furthermore, the invention relates to a measuring apparatus for measuring the shape of a wavefront, particularly to determine at least one radius of curvature of the wavefront, of an active radiation source. Applications of the invention exist particularly in the characterization of radiation sources, particularly laser sources, for example, for data transmission purposes.

A radiation source for optical data transmission comprises, for example, a solid-state laser which is coupled with an optical fiber. A free end of the optical fiber forms a point light source, whose light is converted into a collimated radiation field using a collimation optics. Greater requirements are placed on the collimation of the radiation field for data transmission across large distances, for example, in outer space. The wavefront radius of curvature of the radiation field is typically required to be greater than 150 m, particularly greater than 250 m. Such large radii of curvature represent a challenge for measurement technology. For example, with the radiation field having a diameter of 12 mm and a radius of curvature of 250 m, the pitch of the wavefront is only 72 nm. Generally, it is difficult to record such a small curvature by optical measurement due to the high noise component in the measuring signal of a wavefront sensor. Therefore, the measuring ranges of commercially available wavefront sensors are typically limited to maximum measurable radii of curvature in the range of 50 m to 150 m.

In a standard method for measuring wavefronts, a Shack-Hartmann type wavefront sensor is used, in which the wavefront is imaged with a microarray of optical lenses onto a spatially-resolving optical sensor (see for example WO 01/028411 A1 or EP 0 921 382 A2). This enables the total wavefront to be recorded with one single measurement. However, the disadvantage is that the Shack-Hartmann wavefront sensor is limited to radii of curvature less than 100 m. Thus, a practical application in testing radiation sources for optical data transmission is excluded.

In another type of wavefront sensor, the lens microarray is replaced by a movable pinhole diaphragm. The pinhole diaphragm lets through a part of the radiation field to be investigated (subaperture), which is imaged onto a spatially-resolving optical sensor by the focusing optics. In the case of an ideally collimated radiation field, each part of the wavefront would be imaged onto the optical axis of the focusing optics and in the center of the optical sensor. Through the curvature of the real radiation field, abaxial parts of the wavefront are imaged on a position with a lateral deviation from the optical axis of the focusing optics (deviation position, lateral position). The radius of curvature can be calculated for each part of the wavefront from the deviation position. With a movement of the pinhole diaphragm perpendicular to the optical axis of the radiation field to be investigated, different parts of the wavefront are recorded successively with the result that the total wavefront can be characterized (see for example DE 40 03 698 A1 or DE 40 03 699 A1).

In conventional wavefront sensors with the movable pinhole diaphragm, a limitation was found in that the error in the radius of curvature determined for the subapertures of the wavefront increases with increasing distance from the optical axis of the radiation field. This problem is particularly critical when characterizing radiation sources for optical data transmission, said sources being distinguished by a relatively large aperture in the radiation field (for example, 10 mm to 20 mm). A further problem occurs when using a pinhole diaphragm with several diaphragm openings for multiplex measurements according to DE 40 03 698 A1. Several parts of the wavefront are recorded simultaneously by the optical sensor, which can, however, lead to superposition of diffraction phenomena on adjacent diaphragm openings and to signal corruption by crosstalk. This corruption also particularly affects the measurement of radii of curvature exceeding 150 m. Therefore, the use of conventional wavefront sensors in measuring large radii of curvature is limited.

The problems mentioned do not only occur when characterizing radiation sources for data transmission but also in other optical components as often stipulated, for example, in collimators with stringent requirements on the parallelism of the emitted beams, for example, in collimators, particularly for high-resolution MTF measurements.

OBJECTS OF THE INVENTION

The objective of the invention is to provide an improved method for measuring the shape of a wavefront of an optical radiation field, said method avoiding the disadvantages of conventional techniques. The objective of the invention is particularly to provide a method for measuring the shape of a wavefront, particularly for determining at least one wavefront radius of curvature, with which said method, compared to conventional wavefront sensors, larger radii of curvature, for example, exceeding 150 m, can be recorded, radii of curvature with greater accuracy and reproducibility can be recorded and/or errors in characterizing abaxial parts of the wavefront are reduced. The objective of the invention is also to provide an improved measuring apparatus for measuring the shape of a wavefront of an optical radiation field, said apparatus avoiding the disadvantages of conventional techniques and being distinguished particularly by an enlarged measuring range, greater accuracy and/or reduced errors in radii of curvature of abaxial parts of the wavefront.

These objectives are achieved by a method and a measuring apparatus of the invention.

DESCRIPTION OF THE INVENTION

According to a first general aspect of the invention, the above objective is achieved by a method for measuring the shape of a wavefront of an optical radiation field, which is generated by an active radiation source, for example, a laser source, whereby, with a pinhole diaphragm that can be moved transverse to the optical axis of the radiation source, an imaging optics device (imaging optics) and a spatially-resolving optical sensor, a partial beam of the radiation field at various diaphragm positions of the pinhole diaphragm is imaged onto the optical sensor, the lateral position of the partial beam is recorded each time on the optical sensor, and the shape of the wavefront, particularly at least one wavefront curvature radius, is determined from the lateral positions according to the different diaphragm positions, is calculated. According to the invention, a pentaprism arrangement with at least a first pentaprism is positioned in the light path between the pinhole diaphragm and the imaging optics device so that the partial beam passed through by the pinhole diaphragm hits the imaging optics device in an invariable beam incidence range for all diaphragm positions.

According to a second general aspect of the invention, the above objective is achieved by a measuring apparatus for measuring the shape of a wavefront of an optical radiation field, which is generated by an active radiation source, with a pinhole diaphragm that is movable transverse to the optical axis of the radiation source, with an imaging optics device and with a spatially-resolving optical sensor, whereby various diaphragm positions can be set with the pinhole diaphragm, and at each diaphragm position the imaging optics device images a partial beam from the radiation field under investigation onto the optical sensor, and whereby with the optical sensor a lateral position (deviation position) of the partial beam is recordable relative to the optical axis of the imaging optics device for each of the diaphragm positions of the pinhole diaphragm, and the shape of the wavefront, particularly at least one wavefront radius of curvature, can be determined on the optical sensor from the lateral positions of the partial beam. According to the invention, the measuring apparatus is equipped with a pentaprism arrangement, which has at least a first pentaprism and is arranged between the pinhole diaphragm and the imaging optics device. The at least one first pentaprism can be positioned so that the partial beam passed through each time by the pinhole diaphragm hits the same beam incidence range of the imaging optics device for all diaphragm positions.

The inventor found that, in the conventional wavefront sensor, the wavefront aberration in the measuring telescope falsifies the measurement result when the measuring beam travels across the aperture of the measuring telescope during a measurement. This has an effect particularly on wavefronts with large radii of curvature. According to the invention, the effect of wavefront aberration is minimized by the range of beam incidence into the imaging optics device remaining invariable due to the beam deflection in the first pentaprism during measurement at the various diaphragm positions. The partial beam from the radiation source passed through by the pinhole diaphragm is deflected by the first pentaprism to the optical axis of the imaging optics device. The first pentaprism thus has the advantage that the influence from transverse aberrations in the imaging optics device is minimized. Furthermore, the first pentaprism has the advantage that the influence of translational drive guide errors on the measurement result is minimized. A further advantage consists in the measured lateral position on the optical sensor (measuring signal) being obtained from a very small lateral deviation in the measuring beam focus on the light-sensitive surface of the sensor. The consequence of this is that lateral nonuniformities in the light-sensitive surface (pixel pitch tolerances and thermal and mechanical changes to the pixel pitch) have only a negligible influence on the measuring signal.

The pentaprism is an optical prism with plane incident and emergent surfaces aligned perpendicularly to each other and two plane, inner reflective surfaces which are arranged so that the light entering perpendicularly through the incident surface is doubly reflected on the reflective surfaces and emerges at the emergent surface. The pentaprism has plane top and bottom surfaces, which are aligned parallel to each other and perpendicularly in relation to the incident and emergent surfaces and the reflective surfaces. The pentaprism is arranged so that the bottom surface is aligned parallel to a plane which is defined by the optical axis of the radiation source and an extra-axial partial beam of the radiation source passed through by the pinhole diaphragm. Furthermore, the first pentaprism is arranged so that the incident and emergent surfaces are always aligned perpendicular to the optical axes of the radiation source and the imaging optics device. The pentaprism advantageously has the effect that the partial beam passed through by the diaphragm opening of the pinhole diaphragm falls on the constant beam incidence range of the imaging optics device for all diaphragm positions of the pinhole diaphragm on a movement path transverse to the optical axis of the radiation source. The pentaprism is preferably arranged so that the beam incidence range is a central section of the incident surface of the imaging optics device. The beam incidence range particularly preferably includes the optical axis of the imaging optics device.

In practice, the beam incidence of the partial beam passed through is not ideally constant but is variable within a tolerance range. However, this tolerance range is so small, for example, less than $1/50$, particularly $1/100$ of the diameter of the diaphragm opening, that the remaining shifts in the beam incidence within the tolerance range are negligible in their effect on the measurement of the radius of curvature. The approach according to the invention of the invariable beam incidence range incorporates a constant beam incidence or a beam incidence within the tolerance range, whose effect is negligible on the measurement of the radius of curvature.

The pinhole diaphragm is an opaque plate or film with a diaphragm opening, preferably with one single diaphragm opening. The diaphragm opening is preferably circular. The size of the diaphragm opening, particularly the diameter, is less than the radius of the radiation field investigated, preferably less than $1/3$, for example, less than $1/6$ of the radius. Depending on the position of the diaphragm opening relative to the optical axis of the radiation source, light from a specific subaperture of the wavefront of the radiation field is passed through as a partial beam and imaged, preferably focused, via the first pentaprism and the imaging optics device onto the optical sensor. The lateral positions of the partial beam on the optical sensor directly reproduce the gradient of the wavefront in each subaperture. The radius of curvature of the wavefront can be calculated from this. As a result, a mean radius of curvature of the wavefront or, for the measurement of radii of curvature in different sections (polar or even cartesian) through the wavefront, several radii of curvature of the wavefront can be determined spatially-resolved, each according to the diaphragm positions.

According to a first preferred embodiment of the invention, the setting of the diaphragm positions comprises a linear movement of the pinhole diaphragm perpendicular to the optical axis of the radiation source. The diaphragm positions of the diaphragm opening are set along a first transverse axis perpendicular to the optical axis of the radiation source. To set the invariable beam incidence range on the imaging optics device, the first pentaprism is moved together with the diaphragm opening, in other words with each movement of the pinhole diaphragm to set the diaphragm position of the diaphragm opening, the first pentaprism is moved parallel by the same distance so that the partial beam hits the incident surface of the first pentaprism in the same range at all diaphragm positions. The joint movement of the pinhole diaphragm and the first pentaprism is advantageously simplified if the two components are permanently connected to each other. For example, the pinhole diaphragm and the first pentaprism can be arranged on a common carrier, which is moved parallel to the first transverse axis for setting the diaphragm positions. Alternatively, the pinhole diaphragm can be attached to or can be formed as a film on the incident surface of the pentaprism. In this case, the diaphragm positions are set by a movement of the pentaprism along the first transverse axis.

The first embodiment of the invention has the advantage that the movement of the pinhole diaphragm together with the first pentaprism along the first transverse axis can be realized by a simple linear translational drive, and a one-dimensional sensor, for example, a CCD line or a line of a CCD matrix, can be used as a spatially-resolving optical sensor. If a radiation source has a radially symmetrical radiation field, it is sufficient to measure the shape of the wavefront along the first transverse axis (in other words in one single radial direction perpendicular to the optical axis of the radiation source) to determine the shape of the total wavefront.

According to a second preferred embodiment of the invention, setting the diaphragm positions comprises a movement of the diaphragm opening along at least a second transverse axis perpendicular to the optical axis of the radiation source and setting the beam incidence range on the imaging optics device comprises a rotation of the first pentaprism on a plane perpendicular to the optical axis of the radiation source, i.e. about an axis parallel to the optical axis of the radiation source, and a movement of the first pentaprism together with the movement of the pinhole diaphragm along the second transverse axis. The rotation of the first pentaprism occurs in such a way that its bottom surface remains arranged parallel to the plane defined by the partial beam passed through and the optical axis of the radiation source, or by the second transverse axis and the optical axis of the radiation source.

Advantageously, the second embodiment of the invention permits the measurement of the wavefront in at least one further radial direction which deviates from the first transverse axis, perpendicular to the optical axis of the radiation source, which is particularly advantageous to the measurement of non-radially symmetrical radiation fields, for example, elliptical radiation fields. However, advantages also arise in the measurement of radially symmetrical radiation fields with extremely small wavefront curvatures. The wavefront curvature can be so small that measurements can be taken close to the noise threshold of the sensor. The measurements in different radial sections can then be used to determine a mean radius of curvature. Averaging is preferably over measurements at increments which, through moving the diaphragm, lie below the diameter of the diaphragm opening, and/or over several radial sections through the wavefront.

The pinhole diaphragm and the first pentaprism are preferably permanently connected to each other in the second embodiment of the invention as well, for example, arranged on a common carrier. Due to the rotation of the first pentaprism to align in relation to the second transverse axis, the partial beam of the radiation field is deflected in different directions for each different transverse axis.

According to a first variant of the invention, the possibility exists to arrange the imaging optics device and the optical sensor each according to these directions, in other words to pivot with the first pentaprism about the optical axis of the radiation source.

According to a second, preferred variant, however, it is provided that the imaging optics device and the sensor are arranged on the optical axis of the radiation source. In this case the pentaprism arrangement has a pivotable platform on which the first pentaprism and the pinhole diaphragm are moveably arranged and which supports further pentaprisms, with which the partial beam from the first pentaprism is directed to the beam incidence range of the imaging optics device. By rotating the pivotable platform about the optical axis of the radiation source, the transverse axis can be set, along which the pentaprism is moved with the pinhole diaphragm. Simultaneously, the other pentaprisms are pivoted so that the partial beam hits the imaging optics device and is focused by said device on the sensor.

The number of discrete diaphragm positions at which a measurement of the lateral position of the partial beam on the optical sensor is taken can be selected according to the concrete application of the invention. If, for example, there is information on the form or symmetry of the radiation field of the radiation source, it can suffice if two or three diaphragm positions are set in at least one radial direction perpendicular to the optical axis of the radiation source. However, for a complete characterization of the shape of the wavefront, the diaphragm positions are preferably selected so that the subapertures of the radiation field (aperture sections of the radiation source aperture) recorded by the diaphragm opening overlap each other. Advantageously, this permits a spatially-resolved calculation of the curvature (reciprocal value of the radius of curvature) over the entire wavefront. Alternatively, a continuous movement of the pinhole diaphragm is possible with simultaneous continuous recording of the lateral positions of the recorded partial beam on the optical sensor.

Preferred applications of the invention result from the measurement of radiation sources with a collimated radiation field, whereby the radius of curvature of the wavefront of the radiation field is more than 10,000 times greater than the aperture of the radiation source. Preferably, a radiation field with a radius of curvature of the wavefront is investigated which is at least 150 m, particularly preferably at least 250 m, e.g. at least 500 m.

Compared to the conventional microarrays of optical lenses, the use of the imaging optics device has the advantage that local gradients in the radius of curvature can be recorded with higher resolution. In this arrangement, the telescope optical system preferably has a focal length of at least 300 mm, particularly preferably at least 500 mm. In contrast to that, the Shack-Hartmann wavefront sensor cannot achieve such high resolution as the microlenses have only small apertures (e.g. 0.1 to 0.2 mm) and short focal lengths (e.g. 3 to 8 mm), whereby the sensitivity of the wavefront measurement is reduced and interfering diffraction effects increase. The imaging optics device according to the invention comprises preferably a telescope optical system, as particularly used in autocollimation telescopes.

BRIEF DESCRIPTION OF THE DRAWINGS

Further details and advantages of the invention are described below with reference to the attached drawings, in which.

Figure 1:
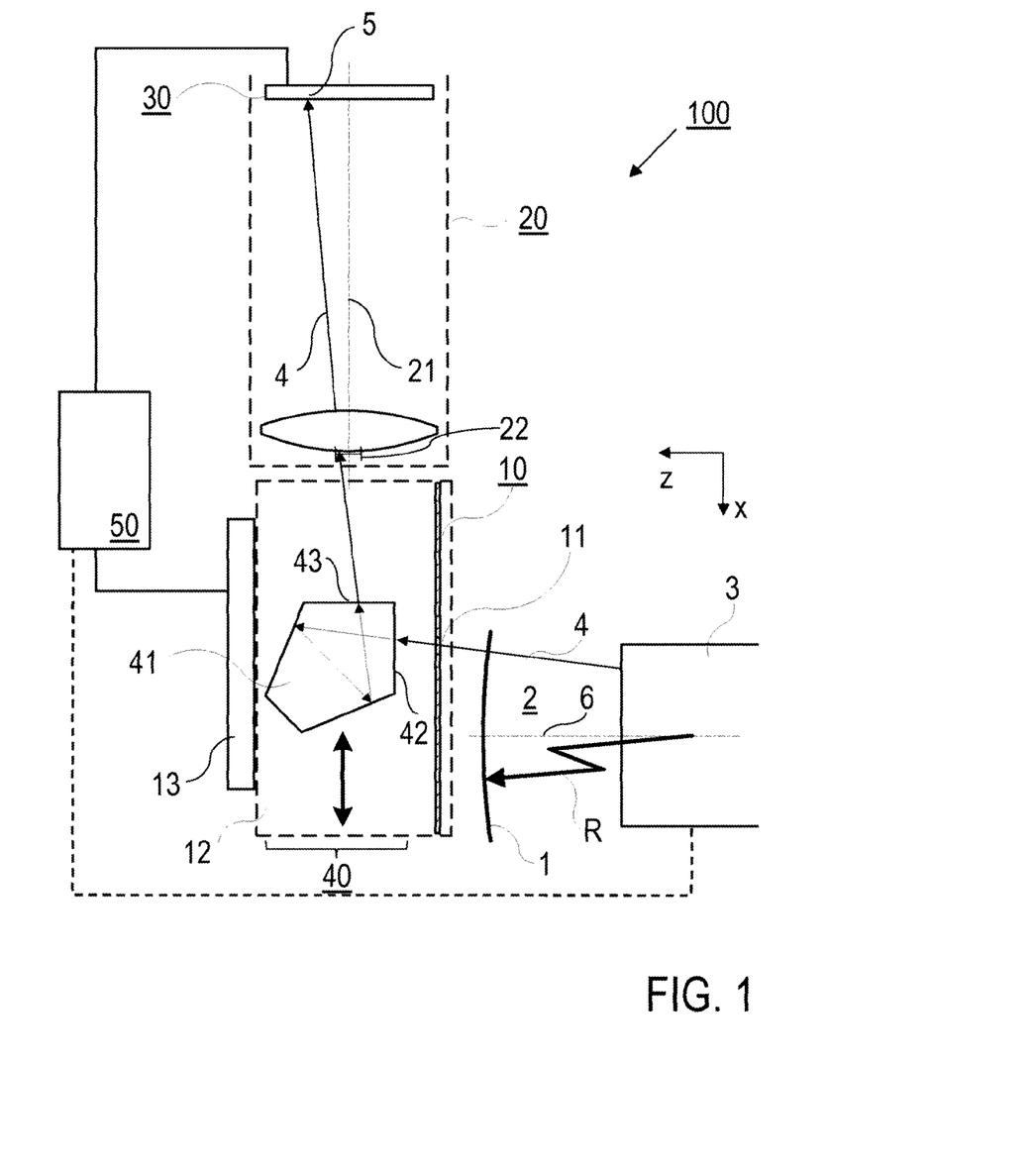
FIG. 1 shows a diagrammatic illustration of the first embodiment of the measuring apparatus according to the invention.

FIG. 1 shows the first embodiment of the measuring apparatus 100 according to the invention with the pinhole diaphragm 10, the imaging optics device 20, the optical sensor 30 and the pentaprism arrangement 40 in diagrammatic plan view not to scale. The measuring apparatus 100 is configured to measure the wavefront 1 of a radiation field 2 of the active radiation source 3. In the following explanation, reference is made by way of example to a cartesian coordinates system whose x and z axes define a horizontal plane (parallel to the plane of projection) and whose y axis runs perpendicular to the horizontal plane. The optical axis 6 of the radiation source 3 runs in the z direction, and the optical axis 21 of the imaging optics device 20 runs in the x direction. The radiation source comprises, for example, a solid-state laser with an output power of 20 W, which is connected to an optical fiber (core diameter 9 μm) and a collimation optical system with three collimation and correction lenses. The radiation source 3 is preferably arranged in a vacuum environment. Details of a vacuum chamber and a vacuum pump are not illustrated in the figures.

The pinhole diaphragm 10 comprises an opaque plate, for example, made of plastic or metal, which contains one single diaphragm opening 11 and which is secured on a pinhole diaphragm carrier 12. The diaphragm opening 11 has a diameter of, for example, 3 mm and is arranged, for example, in the center of the pinhole diaphragm 10. The pinhole diaphragm carrier 12 is equipped with a translational drive 13 with which the pinhole diaphragm carrier 12 can be moved along a first transverse axis (here: x axis) perpendicular to the optical axis 6 of the radiation source 3 (see double-ended arrow). The translational drive 13 comprises, for example, a stepper motor or a piezoelectric drive. Alternatively, a manual movement of the pinhole diaphragm can be provided and the translational drive 13 omitted.

The position of the pinhole diaphragm 10 is determined in such a way that a 0 position (corresponding to the center of the beam) of the pinhole diaphragm 10 is initially determined by a symmetry measurement across the beam section. High sensitivity is possible due to the Gaussian distribution of radiation energy (maximum estimated error 0.1 mm). The measurement positions are then reached, for example, with the stepper motor (accuracy approximately 0.05 mm).

In the first embodiment of the invention, the pentaprism arrangement 40 comprises one single pentaprism 41, which is attached on the pinhole diaphragm carrier 12. The pentaprism 41 is arranged so that its top and bottom surfaces run parallel to the horizontal plane of the measuring apparatus 100, the incident surface 42 runs parallel to the pinhole diaphragm 10 and perpendicular to the horizontal plane, and the emergent surface 43 runs perpendicular to the pinhole diaphragm 10 and to the horizontal plane. The pentaprism 41 is aligned with reference to the pinhole diaphragm 10 so that a partial beam 4 along the optical axis 6 of the radiation source 3 hits the center of the incident surface 42.

With the pentaprism 41, the partial beam 4 is deflected parallel to the horizontal plane to the imaging optics device 20. The imaging optics device 20 is arranged so that the optical axis 21 hits the center of the emergent surface 43 of the pentaprism 41. The imaging optics device 20 is shown diagrammatically by a single focusing lens but, in practice, preferably comprises a focusing optical system comprising several lenses, for example, a telescope (23, see FIG. 3).

The reference numeral 22 refers to a diagrammatically shown beam incidence range of the imaging optics device 20. As only very small normal angles in the wavefront occur at large radii of curvature, the change in location during beam incidence in the focusing optics system 20 is negligibly small in relation to the measured beam length. The diameter of the beam incidence range 22 is almost identical to the diaphragm diameter and is, for example, 2 mm. The changes in position of beam incidence are very much smaller than 2 mm, e.g. 0.03 mm.

The spatially-resolving optical sensor 30 comprises a CCD sensor. It is sufficient to use a CCD line for the first embodiment of the invention shown in FIG. 1, said line extending parallel to the horizontal plane and perpendicular to the optical axis 21 of the imaging optics device 20. However, a CCD matrix is preferably provided, which extends perpendicular to the optical axis 21 of the imaging optics device 20 and to the horizontal plane of the measuring apparatus 100. The CCD matrix enables possible distortions in the measuring signal to be identified and taken into account in the analysis, said distortions being caused by signal components perpendicular to the horizontal plane.

The measuring apparatus 100 is equipped with the diagrammatically-shown control device 50, which is connected to the translational drive 13 and the optical sensor 30 as well as optionally to the radiation source 3. The control device 50 includes a microprocessor with which the translational drive 13 can be controlled to set different diaphragm positions and measured lateral positions 5 of the partial beam 4 on the optical sensor 30 can be converted to radii of curvature R of the wavefront 1. The control device 50 can optionally be adapted for controlling the radiation source 3 during the measurement, for example, to switch on and off or to set different beam intensities.

The measurement of the shape of the wavefront 1 of the optical radiation field 2 of the radiation source 3 comprises the following steps.

First, the radiation source 3 is adjusted in relation to the measuring apparatus 100. The adjustment comprises geometrical alignment and setting an intensity of the radiation field 2 adapted to the sensitivity of the optical sensor 30.

Next, different consecutive diaphragm positions of the pinhole diaphragm 10 are set, whereby the pinhole diaphragm 10 is moved to different positions along the first transverse axis perpendicular to the optical axis 6, in other words in the positive and/or negative x direction(s). The first position in the pinhole diaphragm 10 is selected preferably so that the optical axis 6 of the radiation source 3 runs through the diaphragm opening 11. In this case, the partial beam 4 passed through the diaphragm opening 11 along the optical axis 21 of the imaging optics device 20 is focused in the center of the optical sensor 30. Next, the diaphragm opening 11 is moved in the x direction, whereby the individual diaphragm positions are preferably set by an increment that is less than the diameter of the diaphragm opening 11. The increment is 0.5 mm, for example. At each diaphragm position, the corresponding lateral position 5 of the partial beam 4 on the optical sensor 30 is recorded. With a diameter of the radiation field 2 of 12.5 mm, 19 diaphragm positions, for example, are set and measured according to 19 lateral positions (=18×0.5 mm+2×1.0 mm (diaphragm)). Next, the shape of the wavefront, particularly at least a radius of curvature R, is determined from the diaphragm positions and the recorded lateral positions, as explained below with reference to FIG. 2.

Figure 2:
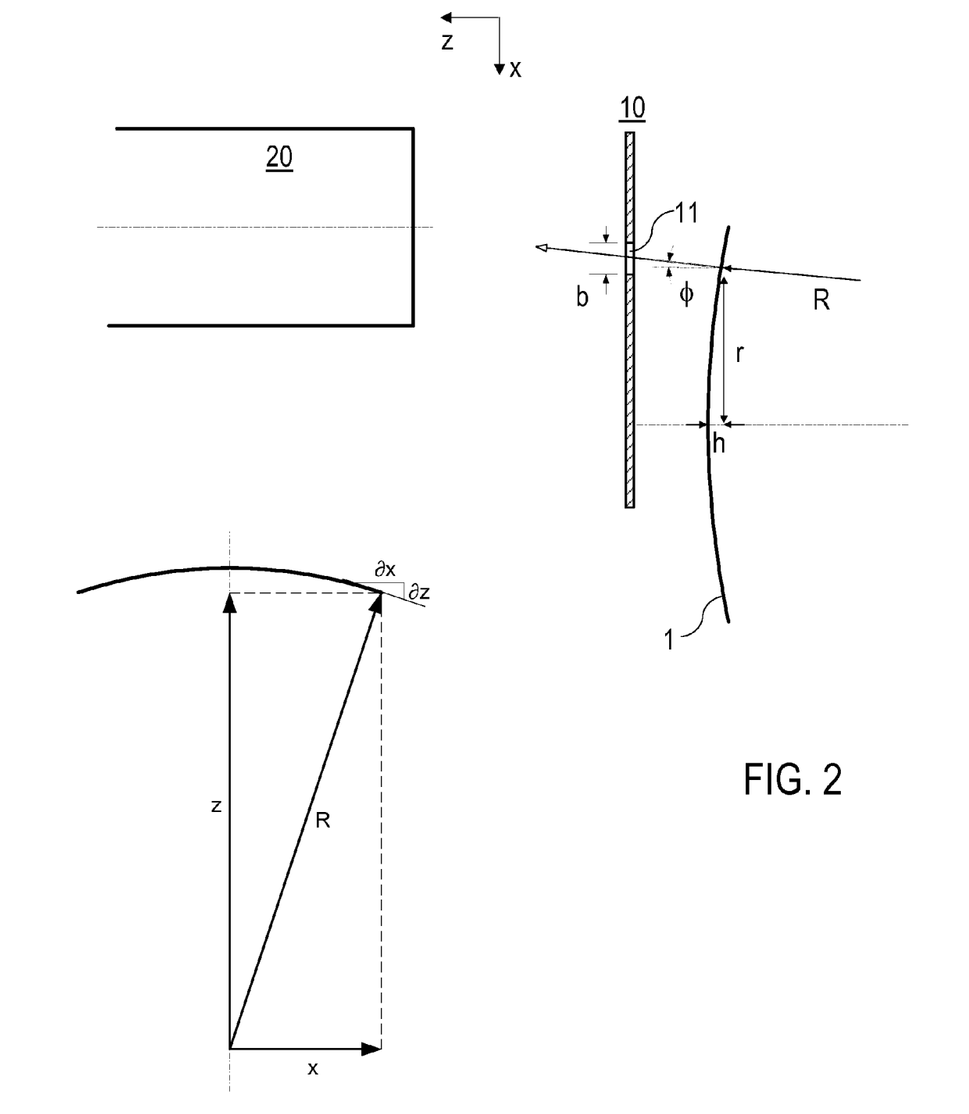
FIG. 2 shows a diagrammatic illustration of determining the radius of curvature.

FIG. 2 shows by way of example the geometrical parameters used to determine the radius of curvature R, whereby, for the sake of clarity, only the wavefront 1, the pinhole diaphragm 10 with the diaphragm opening 11, and the imaging optics device 20 are shown (the pentaprism in particular is not shown). In FIG. 2, R=(local) radius of wavefront (radius of curvature), r=beam radius of the sub-aperture of the wavefront 1 included by the diaphragm opening 11, h=sagitta (pitch) of wavefront section, φ=normal angle of the wavefront, and b=diameter of diaphragm opening 11. By recording the lateral positions 5 of the partial beam 4 on the detector 30 (see FIG. 1), the normal angles cp are calculated for the individual diaphragm positions. With the above-mentioned example parameters, the normal angle at the edge of the beam is approximately 5 arcsec. The radii of curvature are calculated from the normal angles and the diaphragm positions relative to the optical axis of the radiation source as follows. According to the illustration in FIG. 2 (bottom left), $$X^2 + Z^2 = R^2$$

and $$\frac{\partial z}{\partial x} = -\frac{x}{\sqrt{R^2 - x^2}},$$

where with R>>x:

$$\frac{\partial z}{\partial x} = -\frac{x}{R}$$

In the numerical or graphical representation of the relationship between the normal angle and the diaphragm position, the integral of the normal angle provides the curve of the local radius of curvature R. The local radii of curvature are identical to the local gradients of the normal angle. By calculating a best-fit circle, the mean wavefront radius of curvature can be determined from this. From the relationship between the normal angle and the diaphragm position, wavefront errors of a higher order can also be determined.

Figure 3:
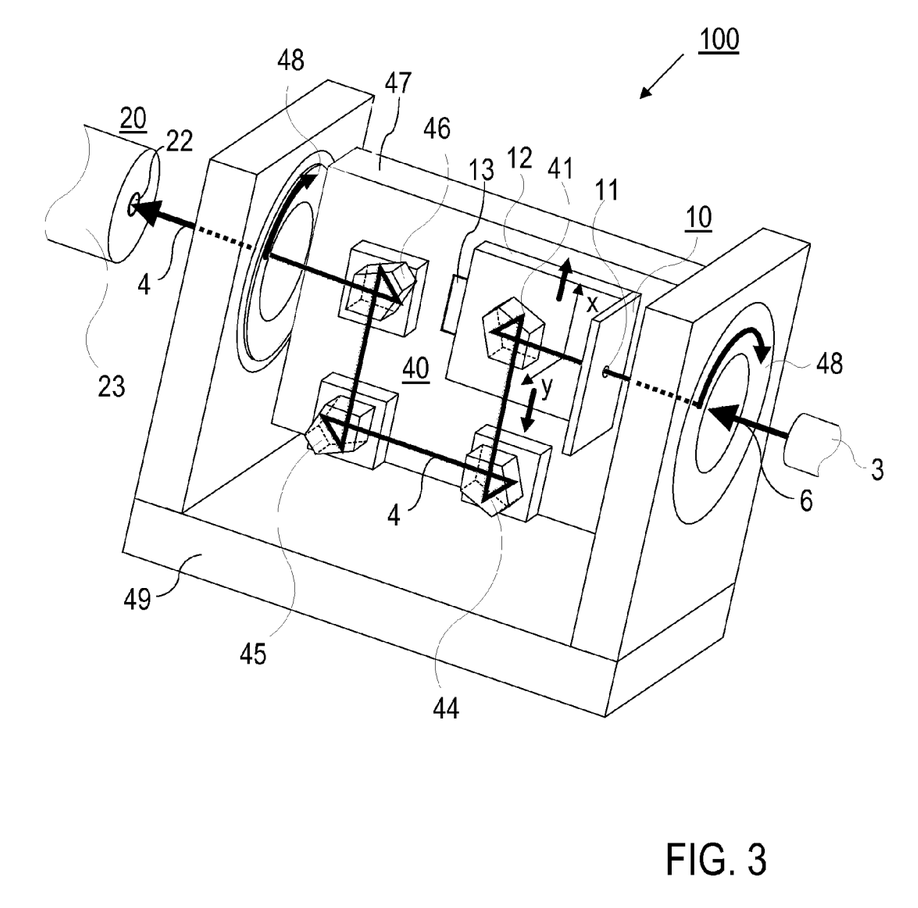
FIG. 3 shows a diagrammatic illustration of the second embodiment of the measuring apparatus according to the invention.

FIG. 3 shows the second embodiment of the invention in diagrammatic form. Here, deviating from the first embodiment according to FIG. 1, the diaphragm positions are not set along a single transverse axis but along at least two transverse axes perpendicular to the optical axis 6 of the radiation source 3. Accordingly, the wavefront of the radiation field of radiation source 3 can be measured in several radial directions.

According to FIG. 3, the measuring apparatus 100 comprises the pinhole diaphragm 10 with the diaphragm opening 11, the imaging optics device 20, the spatially-resolving optical detector (not shown) and the pentaprism arrangement 40. The pentaprism arrangement 40 comprises a pivotable platform 47, which supports the pinhole diaphragm carrier 12 with the pinhole diaphragm 10 and the first pentaprism 41, and supports the lateral drive 13 and three additional pentaprisms 44, 45 and 46. The platform 47 is connected to a fixed support frame 49 via two annular pivot bearings 48. The annular pivot bearings 48 form circular windows of a size that at least equals the diameter of the radiation field of the radiation source 3.

The pinhole diaphragm carrier 12 with the pinhole diaphragm 10 and the first pentaprism 41 is movable on the plane surface of the platform 47 perpendicular to the optical axis 6 of the radiation source 3 and perpendicular to the connection line between the pivot bearings 48. Movement can be done manually or using the translational drive 13. The further pentaprisms 44 to 46 are arranged so that the partial beam 4 deflected by the first pentaprism 41 is directed to the optical axis of the imaging optics device 20. For all diaphragm positions of the pinhole diaphragm 10, the partial beam 4 hits the imaging optics device 20 in an almost constant beam incidence range 22.

For the measurement according to the invention of the shape of the wavefront with the second embodiment according to FIG. 3, in a first step, several diaphragm positions of the pinhole diaphragm 10 are set along a first transverse axis perpendicular to the optical axis 6 of the radiation source 3, and lateral positions on the optical sensor are recorded for each of them. Next, the platform 47 is rotated to set a further transverse axis perpendicular to the optical axis 6 of the radiation source 3. Further diaphragm positions are set on the further transverse axis and the associated lateral positions measured. As a result, the wavefront can be scanned in all radial directions and thus a spatially-resolved calculation of wavefront radii of curvature can be achieved.

The optical sensor 30 is preferably rotated, and the imaging optics device 20 with the platform 47 is particularly preferably rotated as well. The optical sensor 30, preferably also the imaging optics device 20, is by way of example permanently connected to the platform 47. Advantageously, the scanning direction of the pinhole diaphragm 10 thereby agrees with a direction of the CCD matrix of the optical sensor 30.

The second embodiment according to FIG. 3 is of particular advantage if the radiation source is arranged in a vacuum environment. If measurements are taken at normal pressure, measuring according to the invention in several radial directions can alternatively be carried out with the structure according to FIG. 1, whereby the radiation source is rotated about its optical axis relative to the measuring apparatus 100 to set the radial directions.

Each of the features of the invention or a combination or subcombination thereof disclosed in the preceding description, drawings and claims can be of purport in accomplishing the invention in its various embodiments.

What is claimed is:

1. A method for measuring the shape of a wavefront of an optical radiation field which is generated by a radiation source, comprising the steps:

setting various diaphragm positions of a pinhole diaphragm, which has a diaphragm opening movable transversely to an optical axis of the radiation source, wherein a partial beam from a radiation field is passed through the diaphragm opening at each diaphragm position and is imaged on a spatially-resolving optical sensor by an imaging optics device, recording lateral positions of the partial beam relative to an optical axis of the imaging optics device, wherein the lateral positions each with one of the diaphragm positions of the pinhole diaphragm are recorded by the optical sensor, and determining the shape of the wavefront from the recorded lateral positions of the partial beam, wherein a beam incident range of the partial beam which is invariable for all diaphragm positions is set on the imaging optics device with a pentaprism arrangement, which comprises at least a first pentaprism and is positioned between the pinhole diaphragm and the imaging optics device.

2. The method according to claim 1, wherein setting the diaphragm positions comprises a movement of the diaphragm opening along a first transverse axis perpendicular to the optical axis of the radiation source, and a movement of the first pentaprism together with the movement of the diaphragm opening along the first transverse axis are provided for setting the beam incident range.

3. The method according to claim 2, wherein
setting the diaphragm positions further comprises a rotation of the pinhole diaphragm about the optical axis of the radiation source and a movement of the diaphragm opening along at least a second transverse axis perpendicular to the optical axis of the radiation source, and
a rotation of the first pentaprism relative to the optical axis of the radiation source and a movement of the first pentaprism together with the movement of the diaphragm opening along at least a second transverse axis are provided for setting the beam incident range.

4. The method according to claim 3, wherein
the pentaprism arrangement has a pivotable platform which carries the first pentaprism, the pinhole diaphragm and further pentaprisms, with which the partial beam is directed from the first pentaprism to the beam incident range of the imaging optics device, and
the rotation of the first pentaprism is effected by a rotation of the platform about the optical axis of the radiation source.

5. The method according to claim 1, with at least one of the features
the first pentaprism is permanently connected to the pinhole diaphragm,
the diaphragm positions are selected so that the aperture openings of the radiation source recorded from the diaphragm opening at the diaphragm positions overlap each other, and
a radius of curvature of the wavefront is more than 10,000 times greater than the aperture of the radiation source.

6. The method according to claim 1, wherein determining the shape of the wavefront comprises at least one of
a calculation of a mean radius of curvature of the wavefront, and
a calculation of wavefront errors of a higher order.

7. A measuring device for measuring a shape of a wavefront of an optical radiation field, which is generated by a radiation source, said measuring device comprising:
a pinhole diaphragm with a diaphragm opening being movable transversely to an optical axis of the radiation source,
an imaging optics device, and
a spatially-resolving optical sensor, wherein
the pinhole diaphragm is arranged to set various diaphragm positions,
the imaging optics device is arranged so that a partial beam from a radiation field is passed through the diaphragm opening at each diaphragm position and is imaged on the optical sensor by the imaging optics device,
lateral positions of the partial beam relative to an optical axis of the imaging optics device are recordable by the optical sensor each with one of the diaphragm positions of the pinhole diaphragm,
the shape of the wavefront can be determined from the recorded lateral positions of the partial beam,
a pentaprism arrangement with at least a first pentaprism, which is positioned between the pinhole diaphragm and the imaging optics device, and
with the pentaprism arrangement, a beam incident range of the partial beam which is invariable for all diaphragm positions can be set on the imaging optics device.

8. The measuring device according to claim 7, wherein
the diaphragm opening is movable along a first transverse axis perpendicular to the optical axis of the radiation source, and
the first pentaprism of the pentaprism arrangement is movable together with the diaphragm opening.

9. The measuring device according to claim 8, wherein
the pinhole diaphragm is rotatable additionally about the optical axis of the radiation source and the diaphragm opening is movable along at least a second transverse axis perpendicular to the optical axis of the radiation source, and
the first pentaprism of the pentaprism arrangement is rotatable together with the pinhole diaphragm about the optical axis of the radiation source and moved along the second transverse axis.

10. The measuring device according to claim 9, wherein
the pentaprism arrangement has a pivotable platform which carries the first pentaprism, the pinhole diaphragm and further pentaprisms, with which the partial beam from the first pentaprism can be directed into the beam incident range of the imaging optics device, and
the first pentaprism is rotatable by a rotation of the platform about the optical axis of the radiation source.

11. The measuring device according to claim 8, with at least one of the features
the first pentaprism is permanently connected to the pinhole diaphragm, and
the imaging optics device comprises a telescope optical system.

* * * * *